(12) United States Patent
Goisser

(10) Patent No.: US 12,419,722 B2
(45) Date of Patent: Sep. 23, 2025

(54) TURBINE-DRIVEN DENTAL INSTRUMENT

(71) Applicant: DENTSPLY SIRONA Inc., York, PA (US)

(72) Inventor: Siegfried Goisser, Einhausen (DE)

(73) Assignee: Dentsply Sirona Inc., York, PA (US)

( * ) Notice: Subject to any disclaimer, the term of this patent is extended or adjusted under 35 U.S.C. 154(b) by 0 days.

(21) Appl. No.: 17/903,558

(22) Filed: Sep. 6, 2022

(65) Prior Publication Data

US 2022/0409332 A1  Dec. 29, 2022

Related U.S. Application Data

(63) Continuation of application No. 16/461,396, filed as application No. PCT/EP2017/080150 on Nov. 23, 2017, now abandoned.

(30) Foreign Application Priority Data

Nov. 23, 2016  (DE) .......................... 102016223105.7

(51) Int. Cl.
*A61C 1/05* (2006.01)
*A61C 1/12* (2006.01)

(52) U.S. Cl.
CPC ................ *A61C 1/052* (2013.01); *A61C 1/12* (2013.01)

(58) Field of Classification Search
CPC .. A61C 1/12; A61C 1/052; A61C 1/05; A61C 17/005
USPC .................................. 433/132, 133; 409/904
See application file for complete search history.

(56) References Cited

U.S. PATENT DOCUMENTS 2,098,317 A   11/1937  Martin
3,078,576 A    2/1963  Erich et al.
(Continued)

FOREIGN PATENT DOCUMENTS

CH          680042 A5    6/1992
DE         1064682 B     9/1959
(Continued)

OTHER PUBLICATIONS

"U.S. Appl. No. 16/461,396, Non Final Office Action mailed Mar. 4, 2022", 17 pgs.
(Continued)

*Primary Examiner* — Eric J Rosen
*Assistant Examiner* — Courtney N Huynh
(74) *Attorney, Agent, or Firm* — SCHWEGMAN LUNDBERG & WOESSNER, P.A.

(57) ABSTRACT

A flow-driven dental instrument, including a grip part, a head part, a media line, and a fastening device, wherein the grip part is constructed in the form of a sleeve with two ends and a media connection is disposed on the first end. At the second end, the head part projects at least partially into the grip part. A first end of the media line is connected to the head part and the media line extends from the head part through the grip part to the media connection. The fastening device includes a sleeve having an external thread and a nut having an internal thread, wherein the sleeve is connected to the outer wall of the media line in a material-locking manner and, at least in a direction toward the head part, the nut is held in the grip part in a fixed position.

10 Claims, 2 Drawing Sheets

(56) References Cited

U.S. PATENT DOCUMENTS

| | | | | |
|---|---|---|---|---|
| 3,120,705 | A | * | 2/1964 | Hoffmeister ........... A61C 1/052 |
| | | | | 433/132 |
| 3,893,242 | A | | 7/1975 | Lieb et al. |
| 4,017,974 | A | * | 4/1977 | Sotman ................. A61C 1/052 |
| | | | | 433/85 |
| 4,260,382 | A | * | 4/1981 | Thomson ................ A61C 1/05 |
| | | | | 433/29 |
| 2020/0054418 | A1 | | 2/2020 | Goisser |

FOREIGN PATENT DOCUMENTS

| | | |
|---|---|---|
| DE | 102016223105 B3 | 10/2017 |
| EP | 1982668 A1 | 10/2008 |
| WO | WO-2018096012 A1 | 5/2018 |

OTHER PUBLICATIONS

"U.S. Appl. No. 16/461,396, Preliminary Amendment filed May 16, 2019", 4 pgs.
"International Application Serial No. PCT/EP2017/080150, International Preliminary Report on Patentability mailed Feb. 19, 2019", 12 pgs.
"International Application Serial No. PCT/EP2017/080150, International Search Report mailed Mar. 26, 2018", 6 pgs.
"International Application Serial No. PCT/EP2017/080150, Response to Written Opinion filed Jan. 3, 2019 to Written Opinion mailed Nov. 13, 2018", 5 pgs.
"International Application Serial No. PCT/EP2017/080150, Written Opinion mailed Mar. 26, 2018", 7 pgs.

\* cited by examiner

TURBINE-DRIVEN DENTAL INSTRUMENT

TECHNICAL FIELD

The invention relates to a compressed-air-driven dental instrument comprising a grip part and a head part, wherein the head part is releasably fastened to a second end of the grip part using a fastening means.

STATE OF THE ART

A variety of embodiments of flow-driven dental instruments are known in the state of the art and are also referred to as dental turbines, air-driven sonic handpieces and air motors, for example.

Flow-driven dental instruments are not driven by an engine, but rather by compressed air that sets a turbine wheel in rotation. The turbine wheel and a receptacle for a tool are typically accommodated in a so-called head part, which is disposed on a first end of a grip part. The compressed air to drive the turbine wheel is typically provided by a dental unit. For this purpose, on a second end opposite the head part, the grip part includes a corresponding connection for connecting to a hose of a dental unit that is charged with compressed air. Other typically standardized connections for other media, e.g. light and/or water, can be disposed at the second end as well. Corresponding lines, e.g. a tube, hose and/or optical fiber, are disposed in the grip part to conduct each medium from the corresponding connection to the head part and/or to a corresponding outlet disposed on the head part or on the first end of the grip part.

Because of the high demands, i.e. the high load, to which a dental instrument is subjected in everyday use, it is desirable to make the media lines and/or media outlets in the instrument easily accessible.

One solution is known from CH 680 042 A5, which discloses a dental instrument having a grip part, a head part and a metal channel for the air supply that is fixedly connected to the head part, wherein the metal channel comprises an external thread at one end. The head part of the instrument is clamped to the grip part by means of a holding plate resting against a step on an inner wall of the grip part and a nut screwed onto the external thread of the metal channel in the direction of the holding plate.

The underlying object of the present invention is to further develop the aforementioned state of the art.

Presentation of the Invention

A subject matter of the invention is a flow-driven dental instrument, comprising a grip part, a head part, a media line for a medium and a fastening means for connecting the head part with the grip part.

The grip part is constructed in the form of a sleeve with a first end and a second end. A media connection for a supply line providing the medium is disposed on the first end of the grip part. The head part is disposed on the second end of the grip part, and projects at least partially into the grip part. The media line is connected to the head part in a force-locking, form-locking and/or material-locking manner, and the media line extends from the head part through the grip part to the media connection.

The fastening means comprises a sleeve having an external thread and a nut having an internal thread corresponding to the outer thread, wherein the sleeve is disposed around the media line on an outer wall of the media line between the first end of the media line and a second end of the media line, and is connected to the outer wall in a material-locking manner. The nut is disposed in the grip part and, at least in a direction toward the head part, is held in the grip part in a fixed position relative to said grip part. To fasten the head part to the grip part, the nut is at least partially screwed onto the sleeve.

It should be noted that the term media line includes any line that is suitable for conducting a medium, such as water or air. According to one advantageous embodiment, the media line, to which the sleeve is fastened, is a compressed air line for the propellant air for the turbine. In alternative embodiments, the media line is a spray air or spray water line.

The material connection between the sleeve and the media line can be accomplished by means of soldering, welding or adhesive bonding, for example. It is also possible to construct the media line and the sleeve in one piece.

In the region of the thread, the media line is thickened by the sleeve. As a result, a stable thread for fastening the head part to the grip part is provided. The releasable connection of the head and the grip part provided by the thread permits easy access to the media lines and easy servicing. The rest of the media line is constructed with a thinner wall thickness and a correspondingly small space requirement.

The fact that a flow-driven dental instrument with a simple, stable and small design and having easily accessible media lines is provided, is an advantage of the invention.

The media line is advantageously constructed as a tube or as a hose. The media line is not subject to any special requirements imposed by the invention and can be executed in the technically possible or permissible embodiments.

In a region comprising the sleeve and together with sleeve, the media line advantageously comprises a first wall thickness and, in a remaining region, comprises a second wall thickness, whereby the first wall thickness is greater than the second wall thickness, and the second wall thickness is advantageously in particular between 0.1 mm and 0.3 mm and/or the first wall thickness is between 0.2 and 0.5 mm.

It should be noted that the first wall thickness includes the wall thickness of the media line, the sleeve with the thread and, if applicable, a connection means, e.g. an adhesive. The first wall thickness is the distance from the inner wall of the media line to the outermost tip of the thread flanks of the sleeve. Correspondingly, the second wall thickness refers to the wall thickness of the media line of the region of the media line that is not enclosed by the sleeve.

The thinner the media line in the remaining regions, the smaller the overall size of the instrument can be. By locally increasing the wall thickness by attaching the sleeve, a stable thread is provided.

In order to provide a sufficiently stable sleeve and/or media line that also satisfies the hygienic requirements of dental instruments, the sleeve and/or the media line advantageously comprise stainless steel, brass or a copper-nickel-zinc alloy, e.g. nickel silver.

In order to ensure a stable connection between the head part and the grip part, the external thread of the sleeve advantageously comprises a pitch of 0.2 to 0.4 mm or 0.25 to 0.35 mm. The distance between two thread crests, i.e. the lead, is referred to as the pitch.

The sleeve is advantageously connected to the outer wall of the media line in a material-locking manner by means of soldering or by means of adhesive bonding. The sleeve and the media line can thus easily be produced individually in a simple manner, and/or corresponding conventional components can be used, and the sleeve and media line can be connected in a simple manner.

In order to increase the stability of the connection of the nut and the sleeve, i.e. the head part and grip part, and in particular to also create a stable connection using only a few turns, the sleeve is advantageously disposed around at least two media lines.

BRIEF DESCRIPTION OF THE DRAWINGS

Design examples of the invention are shown in the drawing.

The figures show

DESIGN EXAMPLES

Figure 1:
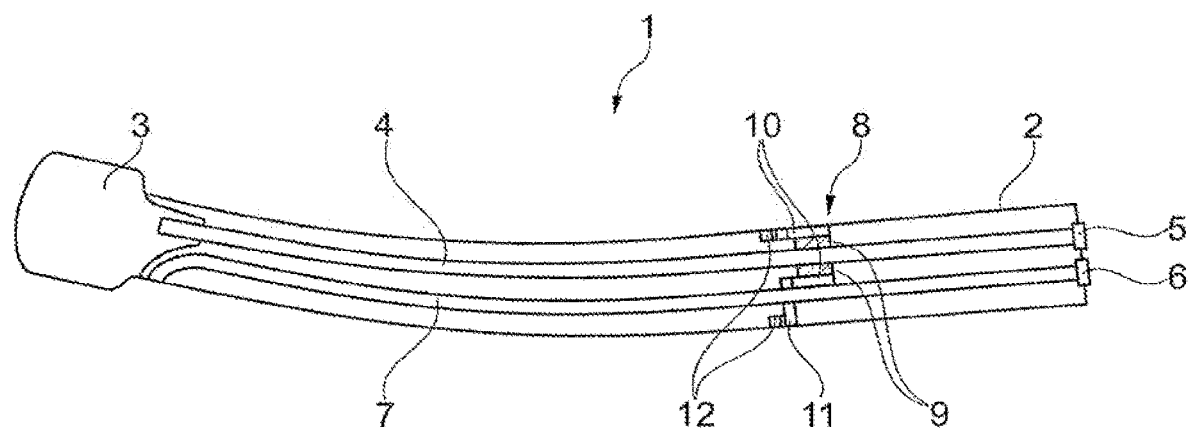
FIG. 1 a schematic illustration of a first embodiment of a flow-driven dental instrument, FIG. 2 a schematic illustration of a first embodiment of a media line according to the invention, FIG. 3 a plan view onto a holding plate from FIG. 1, FIG. 4 an enlarged illustration of a section of a second embodiment of a flow-driven dental instrument.

FIG. 1 schematically shows a first embodiment of a flow-driven dental instrument 1 according to the invention. The instrument 1 comprises a grip part 2 and a head part 3.

A flow-driven turbine for operating a tool and a corresponding receptacle for said tool (not depicted) is disposed in the head part 3. The compressed air for operating the turbine is conducted to the head part 3 by means of a media line 4. For this purpose, a first end of the media line 4 is fastened to the head part 3.

The grip part 2 is constructed in the form of a sleeve with a first end and a second end, wherein the second end comprises a first opening. In the illustrated design example, the first end comprises a compressed air connection 5 for connecting a hose charged with compressed air (not depicted), as well as a water connection 6 for connecting a water-conducting supply line (not depicted).

The head part 3 projects at least partially into the first opening of the grip part 2, wherein, in order to conduct compressed air from a connected hose charged with compressed air to the turbine in the head part 3, the media line 4 extends from the head part 3 through the grip part 2 to the compressed air connection 5.

In order to provide cooling water, also called spray water, a further media line configured as a water line 7 extends from the water connection 6 on the first end of the grip part 2 through the grip part 2 to a second opening of the grip part 2 disposed in the region of the second end of the grip part 2.

The head part 3 is fastened to the grip part 2 using a fastening means 8. The fastening means 8 comprises a sleeve 9 having an external thread and a nut 10 having an internal thread corresponding to the external thread.

The sleeve 9 is disposed on an outer wall of the media line 4 between the first end of the media line 4 and a second end of the media line 4, and connected to the outer wall in a material-locking manner, e.g. by means of soldering or adhesive bonding.

The nut is disposed in the grip part 2 and is in contact with a holding plate 11. The holding plate 11 comprises through holes for the media line 4 with the sleeve 9 and for the water line 7, and rest against a projection 12 of an inner wall of the grip part 2. The nut 10 is therefore held in the grip part 2 by means of a form-fitting connection in the direction of the head part 3.

Figure 2:
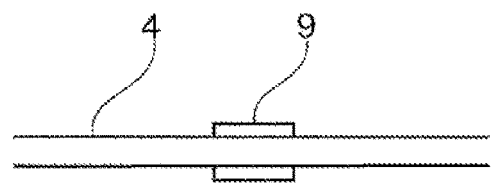

A media line with a sleeve 9 disposed on the outer wall is schematically shown in FIG. 2.

Figure 3:
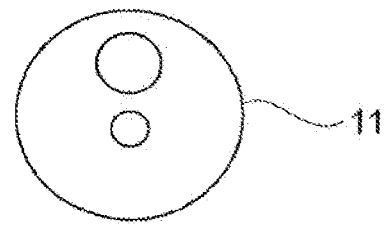

FIG. 3 shows a schematic plan view onto the holding plate 11 from FIG. 1 with the through holes for the media line 4 and the water line 7.

Figure 4:
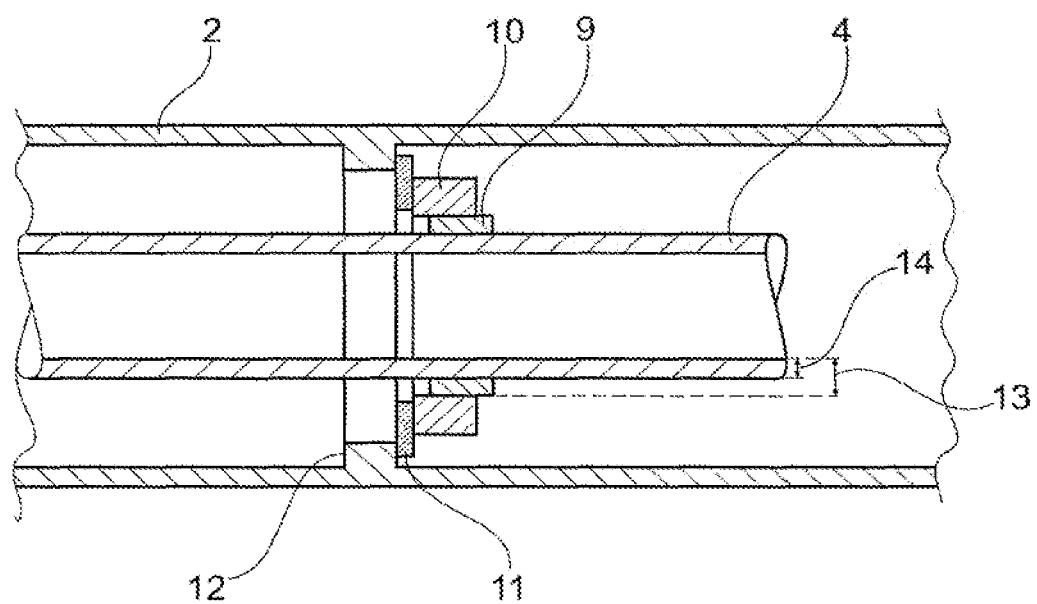

FIG. 4 shows a section of a flow-driven dental instrument 1 according to a second embodiment. The instrument 1 carries only one media line 4, e.g. the compressed air line. The depicted section includes a part of the grip part 2, a part of the media line 4, the nut 10, the sleeve 9, a holding plate 11 with a through hole for the media line and the projection 12 on the inner surface of the grip part 2. A first wall thickness 13 and a second wall thickness 14 of the media line 4 are referenced in the section as well. The first wall thickness 13 refers to the wall thickness in the region of the sleeve 9, i.e. the total wall thickness resulting from the media line 4 and the sleeve 9 with the external thread.

The wall thickness of the media line 4 in a remaining region of the media line 4 that does not comprise the sleeve is referred to as the second wall thickness 14.

The invention claimed is:

1. A flow-driven dental instrument, comprising:
a grip part, a head part, a first media line for a medium, and a fastening device for connecting the head part with the grip part, wherein:
the grip part comprises a first sleeve with a first end and a second end,
a media connection for a supply line providing the medium is disposed on the first end of the grip part,
the head part is disposed on the second end of the grip part, and at least partially projects into the grip part,
the first media line is connected to the head part in a force-locking, form-locking and/or material-locking manner,
the first media line extends from the head part through the grip part to the media connection,
the fastening device comprises an external thread and a nut having an internal thread corresponding to the external thread,
the nut is disposed in the grip part and, at least in a direction toward the head part, is held in the grip part in a fixed position relative to said grip part by a projection on an inner wall of the grip part wherein the projection is an unmovable part of the inner wall,
to fasten the head part to the grip part, the nut is at least partially screwed onto the external thread,
the external thread of the fastening device is provided on a second sleeve disposed around the first media line on an outer wall of the first media line between a first end of the first media line and a second end of the first media line, and is connected to the outer wall in a material-locking manner, and
in a region comprising the second sleeve and together with the second sleeve, the first media line comprises a first wall thickness and, in a remaining region, the first media line comprises a second wall thickness, whereby the first wall thickness is greater than the second wall thickness.

2. The flow-driven dental instrument according to claim 1, wherein the first media line comprises a tube or a hose.

3. The flow-driven dental instrument according to claim 1, wherein the nut is additionally held in the grip part, in a direction toward the head part, by a holding plate.

4. The flow-driven dental instrument according to claim 1, wherein the second wall thickness is between 0.1 mm and 0.3 mm and/or the first wall thickness is between 0.2 and 0.5 mm.

5. The flow-driven dental instrument according to claim 1, wherein the external thread of the second sleeve comprises a pitch of 0.2 to 0.4 mm.

6. The flow-driven dental instrument according to claim 1, wherein the second sleeve is connected to the outer wall of the first media line in the material-locking manner by soldering or by adhesive bonding.

7. The flow-driven dental instrument according to claim 1, wherein the first media line is a compressed air line for propellant air, a spray water line or a spray air line.

8. The flow-driven dental instrument according to claim 1, wherein the instrument comprises a second media line and wherein the second sleeve is disposed around the first and second media lines.

9. The flow-driven dental instrument according to claim 1, wherein the second sleeve comprises at least one of stainless steel, brass, or copper-nickel-zinc alloy.

10. The flow-driven dental instrument according to claim 1, wherein the first media line comprises at least one of stainless steel, brass, or copper-nickel-zinc alloy.

\* \* \* \* \*